United States Patent [19]

Cziptschirsch

[11] 4,353,592
[45] Oct. 12, 1982

[54] SUN VISOR WITH ILLUMINATED MIRROR

[75] Inventor: Kurt Cziptschirsch, Wuppertal, Fed. Rep. of Germany

[73] Assignee: Gebr. Happich GmbH, Fed. Rep. of Germany

[21] Appl. No.: 218,170

[22] Filed: Dec. 19, 1980

[30] Foreign Application Priority Data

Jan. 11, 1980 [DE] Fed. Rep. of Germany ....... 3000810

[51] Int. Cl.³ ................................................ B60J 3/02
[52] U.S. Cl. ............................... 296/97 B; 296/97 H; 362/135
[58] Field of Search ........................... 296/97 B, 97 H; 362/135, 136, 137, 142, 144; 350/310

[56] References Cited

U.S. PATENT DOCUMENTS

| 3,871,703 | 3/1975 | Accatino | 296/97 H |
| 3,926,470 | 12/1975 | Marcus | 296/97 H |
| 4,000,404 | 12/1976 | Marcus | 296/97 H |
| 4,203,149 | 5/1980 | Viertel et al. | 296/97 H |
| 4,227,242 | 10/1980 | Marcus | 362/137 |

Primary Examiner—Robert R. Song
Attorney, Agent, or Firm—Ostrolenk, Faber, Gerb & Soffen

[57] ABSTRACT

The disclosure concerns a sun visor having an illuminated mirror supported in a housing in a recesss in the body of the sun visor. A light source is located behind the mirror and it has exposed contacts. A metal heat insulating plate is located between the light source and the mirror and the metal plate has an anodized, electrically non-conductive surface facing into the housing preventing short circuiting of the light source if the contacts touch the metal plate. The metal plate is deformed to produce beads projecting forward into contact with the mirror, thereby defining an insulating air space between the mirror and the metal plate. A translucent frame in the housing supports the mirror and permits emergence of light around the mirror. The frame includes clip connections for holding the mirror and the metal plate and for holding the frame to the sun visor body.

12 Claims, 2 Drawing Figures

SUN VISOR WITH ILLUMINATED MIRROR

BACKGROUND OF THE INVENTION

The present invention relates to a sun visor for an automotive vehicle and having a mirror.

The mirror is arranged in a housing defined in a recess in the sun visor body. Behind the mirror, there is a covering metal plate, preferably with a heat insulating layer between the mirror and the plate. A source of light is arranged in the housing behind the metal plate.

A sun visor combination of the above described type was provided in the 1978 Cadillac Seville passenger automobile in the U.S.A. A layer of foam is applied to the rear of the mirror. On top of that layer, there is a metal plate of stainless steel. This keeps the heat generated by the source of light away from the mirror. The assembly of mirror, foam layer and metal plate is inserted in a recess in a housing in the sun visor and is fastened therein by means of bending the edge of the housing, using a heated tool, at individual regions around the edge of the metal plate. This known sun visor is relatively heavy and is relatively expensive to manufacture. Applying the backing to the mirror requires several operations and the mounting is also cumbersome and expensive due to the employment of a special tool which can be used for only a single size mirror.

In another known sun visor, electric contacts are arranged in the region of an electrically conductive metal plate which is bonded on the mirror. Short circuiting of the electrical system can occur upon heat-produced deformations or bending during use of the sun visor or the mirror housing.

SUMMARY OF THE INVENTION

The object of the present invention is to provide an easily produced mirrored, lighted sun visor of low weight which does not require any special apparatus for its mounting and which provides sufficient heat insulation between the source of light and the mirror. Another object is to avoid short curciuts between the electric contacts of the source of light.

According to the invention, the metal plate has protruding beads on it which face toward the rear side of the mirror. The beads provide the only surfaces of contact between the metal plate and the mirror, while the rest of the region between the metal plate and the mirror is formed by a cushion of air which serves as a heat-insulating layer.

Furthermore, there is a clip connection between the housing, on the one hand, and the mirror and metal plate, on the other hand. No cement connection is needed between the mirror and the metal plate since the two are joined with the housing by a clip connection. This clip connection is preferably defined by first clipping the mirror and the metal plate into a translucent mirror frame and by then clipping that frame into the housing. No special tool is required to produce the clip connection, since the clip connection can be produced by simply pressing the metal plate and the mirror into the mirror frame and pressing the mirror frame into the housing. The light emerges from inside the housing through the translucent mirror frame, whereby a pleasant diffused light is emitted.

In order to avoid short circuits between the contacts of the source of light, the side of the metal plate which faces the inside of the housing is provided with a non-conductive coating. The metal plate is preferably comprised of aluminum or an alloy thereof, with an anodized surface facing into the housing. Since aluminum or its alloys are good conductors of heat, concentration of heat at any location on the rear of the mirror as a result of the source of light is thereby avoided. Due to the use of an anodized surface, an electrically non-conductive coating is obtained which prevents short circuits. Furthermore, since anodized aluminum surfaces are highly reflective, there is additional assurance that most of the heat radiated by the source of light will be reflected by the metal plate, and only the small non-reflected portion will be absorbed by the plate, and this heat will be distributed over the large surface of the plate.

Other objects and features of the invention will become apparent from the following description considered with reference to the accompanying drawings showing an illustrative embodiment.

DESCRIPTION OF A PREFERRED EMBODIMENT

Figure 1:
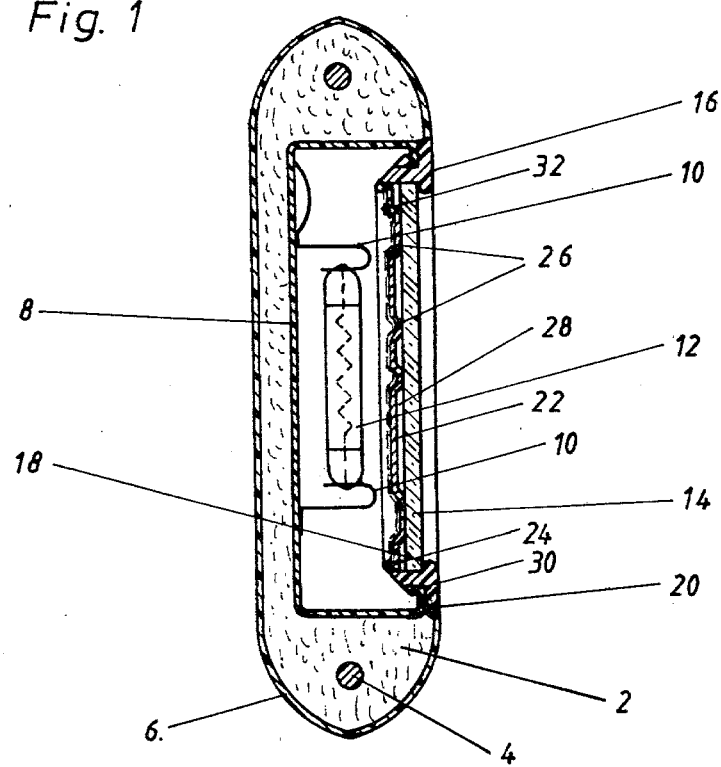
FIG. 1 is a cross-section through the sun visor of the invention.

The sun visor shown in FIG. 1 has a sun visor body 2 of foamed plastic material, which is strengthened by a reinforcing insert 4 developed as a wire frame. The sun visor body 2 is surrounded by a cover layer 6. A housing 8 is positioned in a correspondingly contoured recess in the sun visor body 2. Inside the housing 8, there are soffits 10 which are connected by wires for the conduction of current (not shown) to one or more incandescent bulbs 12. See e.g. U.S. Pat. No. 4,174,864. A mirror 14 is clipped into a supporting frame 16. The front side of the mirror lies against an inner peripheral restng surface 18 in the frame 16. An outer peripheral resting surface 20 of the frame 16 lies against the housing 8 for positioning the frame 16.

There is a metal plate 22 positioned behind the mirror 14 and between the light source 12 and the mirror. The mirror 14 and the metal plate 22 are held fast in the frame 16 by clip projections 24 of the frame.

Figure 2:
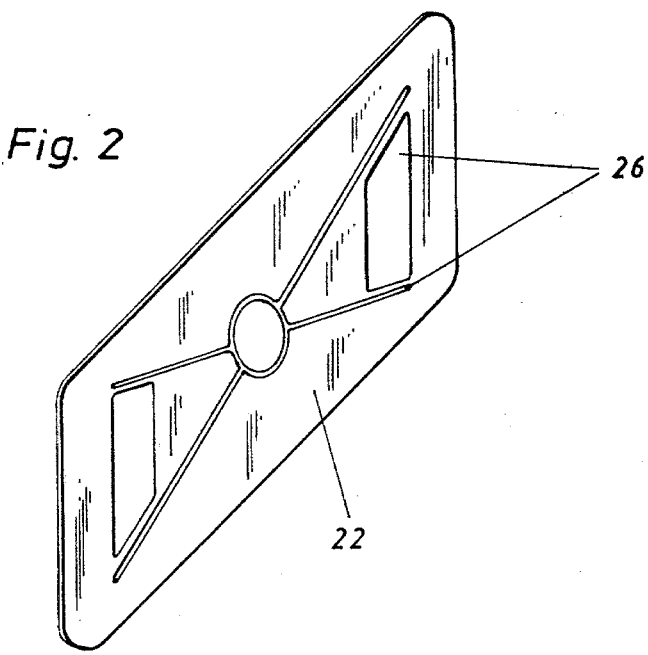
FIG. 2 is a perspective view of the metal plate arranged on the rear of the mirror in the sun visor.

Beads 26, which are defined by deforming or impressing metal plate 22, rest against the rear of the mirror 14. The configuration of the beads 26 is apparent from FIG. 2, although any other bead configuration, which provides adequate support for the plate with minimal contact between the plate and the mirror, will suffice. The beads raise the plate 22 off the mirror 14 so that an air cushion 28 is formed between the mirror 14 and the metal plate 22. This air cushion serves as a heat-insulating layer because of the low thermal conductivity of the air.

The frame 16 is clipped into the housing 8 by means of clip projections 30. The clip connection between the frame 16 and the housing 8 can reduce rattling as a result of close manufacturing tolerances which can easily be maintained. This is more difficult to obtain in the case of the clip connection of the mirror 14 with the frame 16 since glass mirrors have a relatively large tolerance in thickness. The beads 26 developed on the metal plate 22 are generally resilient and thus provide considerable resilience to the metal plate 22 in the region of the clip projections 24. This assures that a rattlefree seating of the mirror in the frame 16 is obtained even within the wide scope of the thickness tolerances of glass mirrors.

The surface of the metal plate 22 which faces the inside of the housing is provided with an electrically non-conductive layer 32, preferably comprising an anodized surface on the metal plate 22 which is of aluminum or an aluminum alloy. The electrically nonconductive layer 32 prevent occurrence of a short circuit between the soffits 10 through the plate 22 in case of deformations of the sun visor.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What I claim is:

1. A sun visor with an illuminated mirror, comprising: a sun visor body; a recess in a surface of the sun visor body; a housing defined in the recess;
   a mirror supported in the housing toward the surface of the sun visor body, leaving space behind the mirror in the housing; a light source in the space in the housing behind the mirror;
   a metal plate behind the mirror in the housing and between the light source and the mirror;
   support means between the housing, on the one hand, and the mirror and the metal plate, on the other hand;
   beads protruding from the metal plate to the rear side of the mirror, thereby defining a space between the metal plate and the mirror for serving as a heat insulating layer.

2. The sun visor of claim 1, wherein the support means comprises a clip connection between the housing and the mirror, and a clip connection between the housing and the metal plate.

3. The sun visor of claim 1, wherein the support means comprises a translucent material mirror frame around the mirror and which is mounted in the housing, the frame being shaped and positioned for transmitting light out of the housing.

4. The sun visor of claim 3, including fastening means on the mirror frame for holding the mirror to the frame.

5. The sun visor of claim 4, wherein the mirror frame includes fastening means for holding the metal plate.

6. The sun visor of either of claims 4 or 5, wherein the mirror frame is mounted to the housing by a clip connection, and the fastening means comprise clip connections.

7. The sun visor of claim 1, wherein the metal plate is flat and the beads comprises deformations of the plate.

8. The sun visor of either of claims 1 or 7, further comprising the metal plate having a side facing into the housing and that side having an electrically non-conductive surface thereon.

9. The sun visor of claim 8, further comprising electric contacts to the light source and located behind the metal plate in the housing and being so placed that deformation of the sun visor body which moves the contacts into engagement with the metal plate causes engagement between the contacts and the non-conductive surface.

10. The sun visor of claim 8, wherein the electrically non-conductive surface is coated on the metal plate.

11. The sun visor of claim 10, wherein the metal plate is comprised of aluminum having an anodized surface thereon serving as the non-conductive surface thereof.

12. The sun visor of claim 10, wherein the metal plate is comprised of aluminum alloy having an anodized surface thereon serving as the non-conductive surface thereof.

* * * * *